US012768515B2

(12) United States Patent
Xu

(10) Patent No.: US 12,768,515 B2
(45) Date of Patent: Oct. 20, 2026

(54) SWINGING CANDLE LAMP

(71) Applicant: Powerbeauty (Dongguan) Industrial Co., Ltd., Dongguan (CN)

(72) Inventor: Yiqun Xu, Dongguan (CN)

(73) Assignee: Powerbeauty (Dongguan) Industrial Co., Ltd., Dongguan (CN)

( * ) Notice: Subject to any disclaimer, the term of this patent is extended or adjusted under 35 U.S.C. 154(b) by 0 days.

(21) Appl. No.: 19/313,917

(22) Filed: Aug. 29, 2025

(65) Prior Publication Data

US 2025/0389406 A1 Dec. 25, 2025

(30) Foreign Application Priority Data

Mar. 4, 2025 (CN) ........................ 202510254541.5

(51) Int. Cl.

| | |
|---|---|
| ***F21V 14/02*** | (2006.01) |
| ***F21V 3/02*** | (2006.01) |
| ***F21V 15/01*** | (2006.01) |
| ***F21V 23/06*** | (2006.01) |
| ***F21W 121/00*** | (2006.01) |
| ***F21Y 115/10*** | (2016.01) |

(52) U.S. Cl.

CPC ................ *F21V 14/02* (2013.01); *F21V 3/02* (2013.01); *F21V 15/01* (2013.01); *F21V 23/06* (2013.01); *F21W 2121/00* (2013.01); *F21Y 2115/10* (2016.08)

(58) Field of Classification Search

CPC . F21V 14/02; F21V 3/02; F21V 15/01; F21V 23/06; F21W 2121/00; F21Y 2115/10; F21S 6/001; F21S 10/046

See application file for complete search history.

(56) References Cited

U.S. PATENT DOCUMENTS

| | | | | |
|---|---|---|---|---|
| 10,060,586 | B1 * | 8/2018 | Chen | F21S 10/046 |
| 10,731,811 | B1 * | 8/2020 | Wu | F21S 10/046 |
| 12,222,076 | B1 * | 2/2025 | She | F21K 9/65 |
| 2015/0036348 | A1 * | 2/2015 | Dong | F21V 23/002 362/372 |
| 2015/0204498 | A1 * | 7/2015 | Hau | F21V 23/00 362/650 |
| 2015/0233555 | A1 * | 8/2015 | Poon | F21V 19/04 362/569 |
| 2021/0080092 | A1 * | 3/2021 | Carpintero | F21S 10/043 |
| 2022/0341555 | A1 * | 10/2022 | Sena | F21S 10/046 |

FOREIGN PATENT DOCUMENTS

CN 206803013 U 12/2017

* cited by examiner

*Primary Examiner* — Tsion Tumebo

(57) ABSTRACT

A swinging candle lamp includes a candle lamp body, a swinging support frame, an electric lamp, a driving device, a first electrode support member and a second electrode support member. The electric lamp is electrically connected with a first contact pin and a second contact pin, one of the first and the second electrode support members is electrically connected and rotatably connected with the first contact pin, and the other one of the first and the second electrode support members is electrically connected and rotatably connected with the second contact pin, the swinging support frame is swingably supported on the candle lamp body, rotation centerlines of the first contact pin and the second contact pin are collinear, and the driving device is assembled on the swinging support frame and the candle lamp body. The swinging candle lamp has a simple structure and easy assembly.

13 Claims, 7 Drawing Sheets

SWINGING CANDLE LAMP

CROSS REFERENCE TO RELATED APPLICATIONS

The present application claims the benefit of Chinese Patent Application No. 2025102545415 filed on Mar. 4, 2025, the contents of which are incorporated herein by reference in their entirety.

FIELD OF THE INVENTION

The present invention relates to a simulated lighting device, and more particularly to a swinging candle lamp.

BACKGROUND OF THE INVENTION

For example, in the simulated candle lamp disclosed in Chinese Patent Application No. 201720429377.8, a lamp head is mounted on the upper end of a candle tube via an elastic shaft, a light-emitting element is arranged inside the lamp head, and the light-emitting element is electrically connected to a driving device installed inside the lamp head through wires.

Since the swinging motion of the lamp head relative to the candle tube requires the use of an elastic shaft, and the electrical connection between the light-emitting element and the driving device relies on wires, the simulated candle lamp disclosed in Chinese Patent Application No. 201720429377.8 suffers from drawbacks such as a complex structure and troublesome assembly. Additionally, it also results in the limitation that the driving device and the light-emitting element can only be installed together on the lamp head.

Therefore, there is an urgent need for a swinging candle lamp that overcomes one or more of the aforementioned drawbacks.

SUMMARY OF THE INVENTION

The objective of the present invention is to provide a swinging candle lamp with a simple structure and easy assembly.

In order to achieve the above objective, the present invention provides a swinging candle lamp including a candle lamp body, a swinging support frame, an electric lamp assembled on the swinging support frame, and a driving device for driving the swinging support frame to perform a swinging motion. The swinging candle lamp further includes a first electrode support member and a second electrode support member assembled on the candle lamp body and spaced apart from each other, the electric lamp is electrically connected with a first contact pin and a second contact pin, one of the first electrode support member and the second electrode support member is electrically connected and rotatably connected with the first contact pin, and the other one of the first electrode support member and the second electrode support member is electrically connected and rotatably connected with the second contact pin, the swinging support frame is swingably supported on the candle lamp body, rotation centerlines of the first contact pin and the second contact pin are collinear, and the driving device is assembled on the swinging support frame and the candle lamp body.

Compared with the prior art, in the present invention, one of the first electrode support member and second electrode support member is rotatably and electrically connected with the first contact pin, while the other is rotatably and electrically connected with the second contact pin, thus the first and second contact pins integrates both rotational and electrical connection functions. On one hand, the need for electrical connection wiring between the light emitter and driving device in conventional designs is eliminated, resulting in simpler structure and easier assembly. On the other hand, it allows the driving device to be installed on the candle lamp body while the electric lamp is mounted on the swinging support frame, thereby overcoming the limitation in prior art where the driving device and light emitter could only be installed together on the lamp head.

Preferably, the first electrode support member is provided with a first hole, the first contact pin is provided with a first extension part extending along a spaced-apart direction of the first electrode support member and the second electrode support member, and the first extension part is rotatably and electrically inserted into the first hole.

Preferably, the second electrode support member is provided with a second hole, the second contact pin is provided with a second extension part extending along the spaced-apart direction, the second extension part is rotatably and electrically inserted into the second hole; and the first extension part and the second extension part are coaxially arranged.

Preferably, the swinging support frame is located between the first electrode support member and the second electrode support member in the spaced-apart direction.

Preferably, the driving device is electrically connected with the first electrode support member and the second electrode support member respectively.

Preferably, the first extension part is protruded from a side of the swinging support frame facing the first electrode support member, and the second extension part is protruded from a side of the swinging support frame facing the second electrode support member.

Preferably, the swinging support frame is internally provided with a channel, a first through hole, and a second through hole communicating with the channel, the channel penetrates upward through a top end of the swinging support frame, the first through hole penetrates through a side wall of the swinging support frame facing the first electrode support member, the second through hole penetrates through a side wall of the swinging support frame facing the second electrode support member; the first contact pin and the second contact pin are located in the channel, the first extension part on the first contact pin is extended out of the swinging support frame through the first through hole, the second extension part on the second contact pin is extended out of the swinging support frame through the second through hole, and the electric lamp is located at the top end of the swinging support frame and exposed externally.

Preferably, the swinging candle lamp further includes a lampshade assembled and connected with the swinging support frame and covering the electric lamp.

Preferably, the swinging support frame includes a first support frame and a second support frame assembled together in a swinging direction, the first support frame and the second support frame jointly define the first through hole, the second through hole, and the channel.

Preferably, the candle lamp body is internally provided with a receiving cavity, an opening of the receiving cavity is located on a top surface of the candle lamp body, the swinging support frame is located in the receiving cavity, a top end of the swinging support frame is extended out of the candle lamp body through the opening, the electric lamp is located on the top end of the swinging support frame; the first hole of the first electrode support member is located in the receiving cavity near the opening, and the second hole of the second electrode support member is located in the receiving cavity near the opening.

Preferably, a side wall of the candle lamp body is further provided with a first support and a second support protruding into the receiving cavity, the first support and the second support are arranged spaced apart in the spaced-apart direction, the first support is provided with a first vertical passage, the second support is provided with a second vertical passage, the first electrode support member is fittingly inserted in the first vertical passage, the second electrode support member is fittingly inserted in the second vertical passage.

Preferably, an upper end of the first electrode support member is extended upward out of the first vertical passage, the upper end of the first electrode support member is provided with a first bending portion bent toward a direction close to a vertical central line of the receiving cavity and a first support portion bent upward from an end of the first bending portion, the first hole of the first electrode support member is located on the first support portion.

Preferably, an upper end of the second electrode support member is extended upward out of the second vertical passage, the upper end of the second electrode support member is provided with a second bending portion bent toward a direction close to the vertical central line of the receiving cavity and a second support portion bent upward from an end of the second bending portion, the second hole of the second electrode support member is located on the second support portion.

Preferably, the candle lamp body includes a base, a first upright frame connected with the base and protruding upward from the base, and a second upright frame assembled with the first upright frame in the swinging direction, the second upright frame is spaced apart from the base in a vertical direction, and the second upright frame and the first upright frame jointly define the receiving cavity, the first vertical passage, and the second vertical passage.

Preferably, the driving device includes a magnet installed at a bottom end of the swinging support frame, a circuit board, and an induction coil installed on the base, a lower end of the first electrode support member, a lower end of the second electrode support member, and the induction coil are all electrically connected with the circuit board, the circuit board is configured to control the induction coil to be energized or de-energized, and the swinging support frame is driven to swing under a cooperation of the magnet and the induction coil that is energized or de-energized.

Preferably, the first electrode support member is provided with a first extension part extending along a spaced-apart direction of the first electrode support member and the second electrode support member, the first contact pin is provided with a first hole, and the first extension part is rotatably and electrically inserted into the first hole; the second electrode support member is provided with a second extension part extending along the spaced-apart direction, the second contact pin is provided with a second hole, the second extension part is rotatably and electrically inserted into the second hole; and the first extension part and the second extension part are coaxially arranged.

DETAILED DESCRIPTION OF ILLUSTRATED EMBODIMENTS

Figure 1:
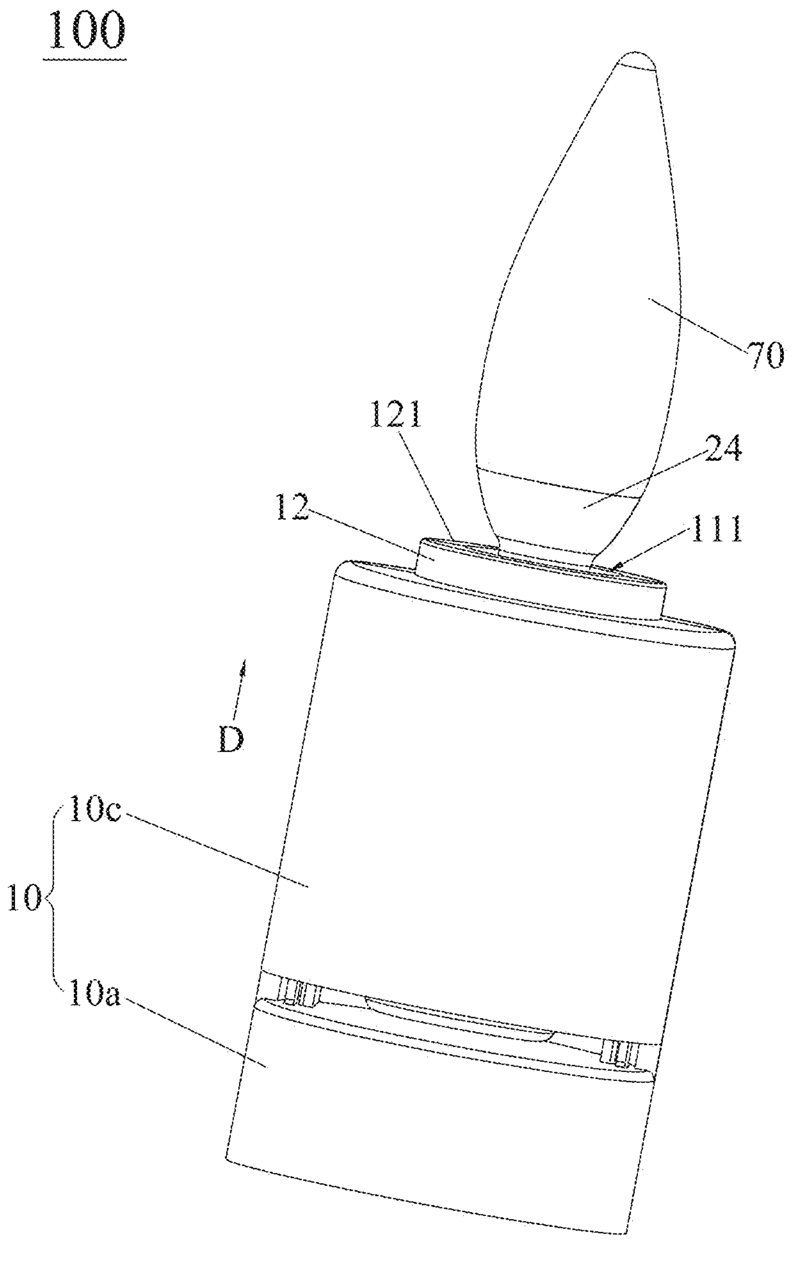
FIG. 1 is a perspective view of the swinging candle lamp of the present invention.

To elaborate the technical content and structural features of the present invention, the following detailed description is provided in conjunction with the embodiments and the drawings.

Referring to FIGS. 1, 4, 5, and 6, the swinging candle lamp 100 of the present invention includes a candle lamp body 10, a swinging support frame 20, an electric lamp 30 (referring to FIG. 6) assembled on the swinging support frame 20, a driving device 40 for driving the swinging support frame 20 to perform a swinging motion, and a first electrode support member 50 and a second electrode support member 60 assembled on the candle lamp body 10 and spaced apart from each other. Optionally, in FIGS. 6 and 7, as an example, both the first electrode support member 50 and the second electrode support member 60 are sheet-like structures arranged vertically to minimize their thickness dimensions. Additionally, the first electrode support member 50 and the second electrode support member 60 may be made of copper sheets for excellent conductivity. Alternatively, depending on practical needs, the first electrode support member 50 and the second electrode support member 60 may also be designed as columnar structures and made of other conductive materials besides copper.

Figure 7:
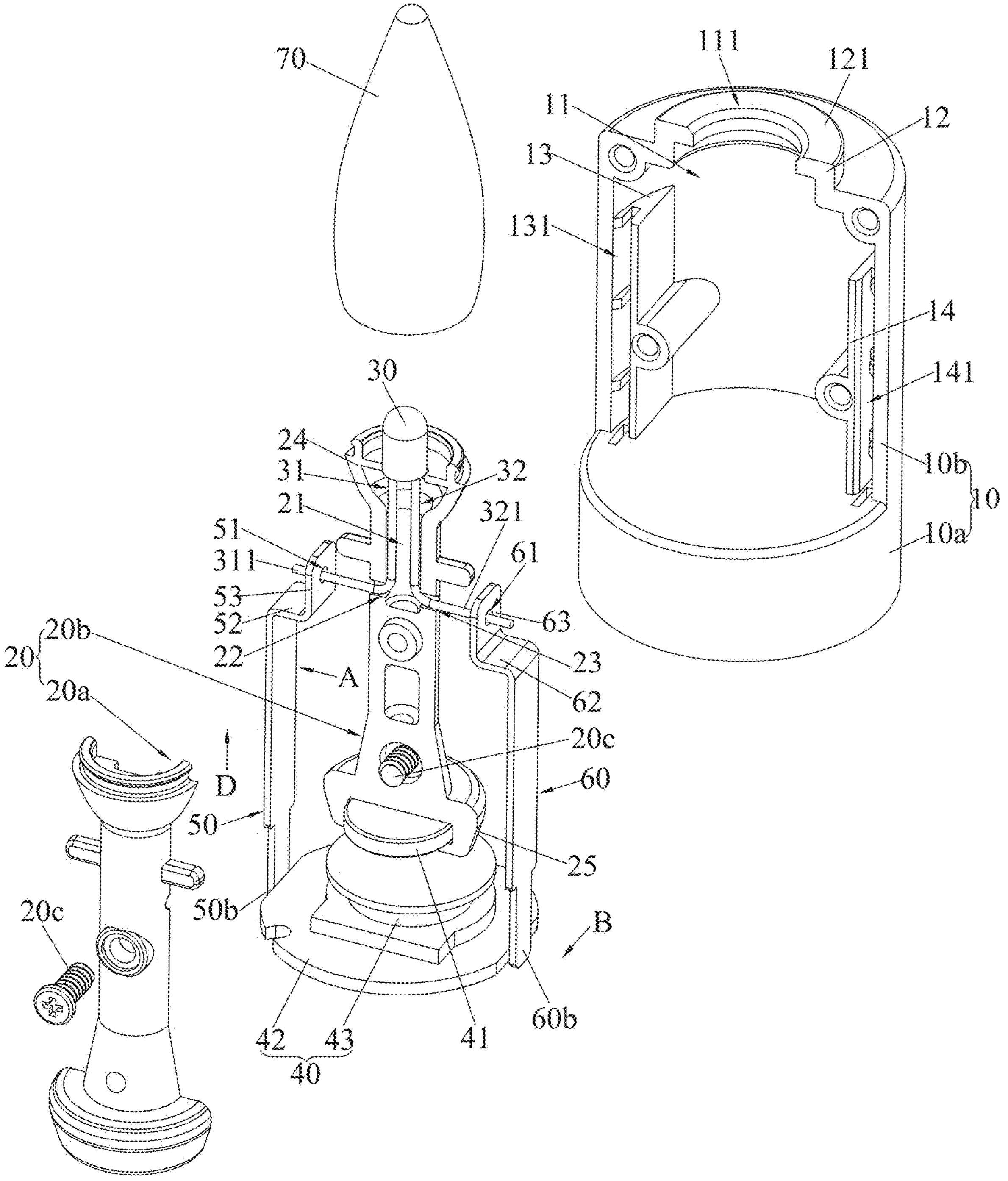
FIG. 7 is a further exploded perspective view of FIG. 6.

Further referring to FIG. 7, as an example, the electric lamp 30 is electrically connected with a first contact pin 31 and a second contact pin 32 to enable positive and negative electrical connections with an external power source. The first contact pin 31 is rotatably and electrically connected to the first electrode support member 50, while the second contact pin 32 is rotatably and electrically connected to the second electrode support member 60. This allows the swinging support frame 20 to be swingably supported on the candle lamp body 10, with the rotational centerlines of the first contact pin 31 and the second contact pin 32 being collinear (see the central axis in the left-right direction in FIG. 5). The driving device 40 is assembled on both the swinging support frame 20 and the candle lamp body 10 and is electrically connected to the first electrode support member 50 and the second electrode support member 60, as shown in FIG. 7.

In FIG. 7, the first contact pin 31 faces the first electrode support member 50 and is opposite to the second electrode support member 60, and the second contact pin 32 faces the second electrode support member 60 and is opposite to the first electrode support member 50, thus it eliminates the need for bending/clearance designs that would otherwise be required if the first electrical contact 31 (facing the first electrode support member 50) had to be rotationally connected with the second electrode support member 60, and the second electrical contact 32 (facing the second electrode support member 60) had to be rotationally connected with the first electrode support member 50. This simplifies the assembly relationship between the first contact pin 31 and the first electrode support member 50, as well as between the second contact pin 32 and the second electrode support member 60.

More specifically, as shown in FIGS. 2, 4, 6, and 7, one way to achieve the rotatable connection between the first contact pin 31 and the first electrode support member 50 is as follows: The first electrode support member 50 has a first hole 51, and the first contact pin 31 has a first extension part 311 extending along the spaced-apart direction (illustrated as arrow A and its opposite direction) of the first and second electrode support members 50, 60. The first extension part 311 is rotatably and electrically inserted into the first hole 51, facilitating the assembly. Alternatively, the positions of the first hole 51 and the first extension part 311 may be interchanged, though this may require adaptive adjustments to their shapes and dimensions, which is within the knowledge of those skilled in the art.

Additionally, as shown in FIGS. 2, 4, 6, and 7, one way to achieve the rotatable connection between the second contact pin 32 and the second electrode support member 60 is as follows: The second electrode support member 60 has a second hole 61, and the second contact pin 32 has a second extension part 321 extending along the spaced-apart direction (as denoted by arrow A and its opposite direction). The second extension part 321 is rotatably and electrically inserted into the second hole 61, and the second extension part 321 is also coaxially arranged with the first extension part 311. Thus, on the one hand, it ensures that the rotation centerlines of the two are collinear, and on the other hand, it facilitates the assembly operation between the second contact pin 32 and the second electrode support 60. Alternatively, the positions of the first hole 51 and the first extension part 311 may be interchanged, though this may require adaptive adjustments to their shapes and dimensions, which is within the knowledge of those skilled in the art.

Figure 6:
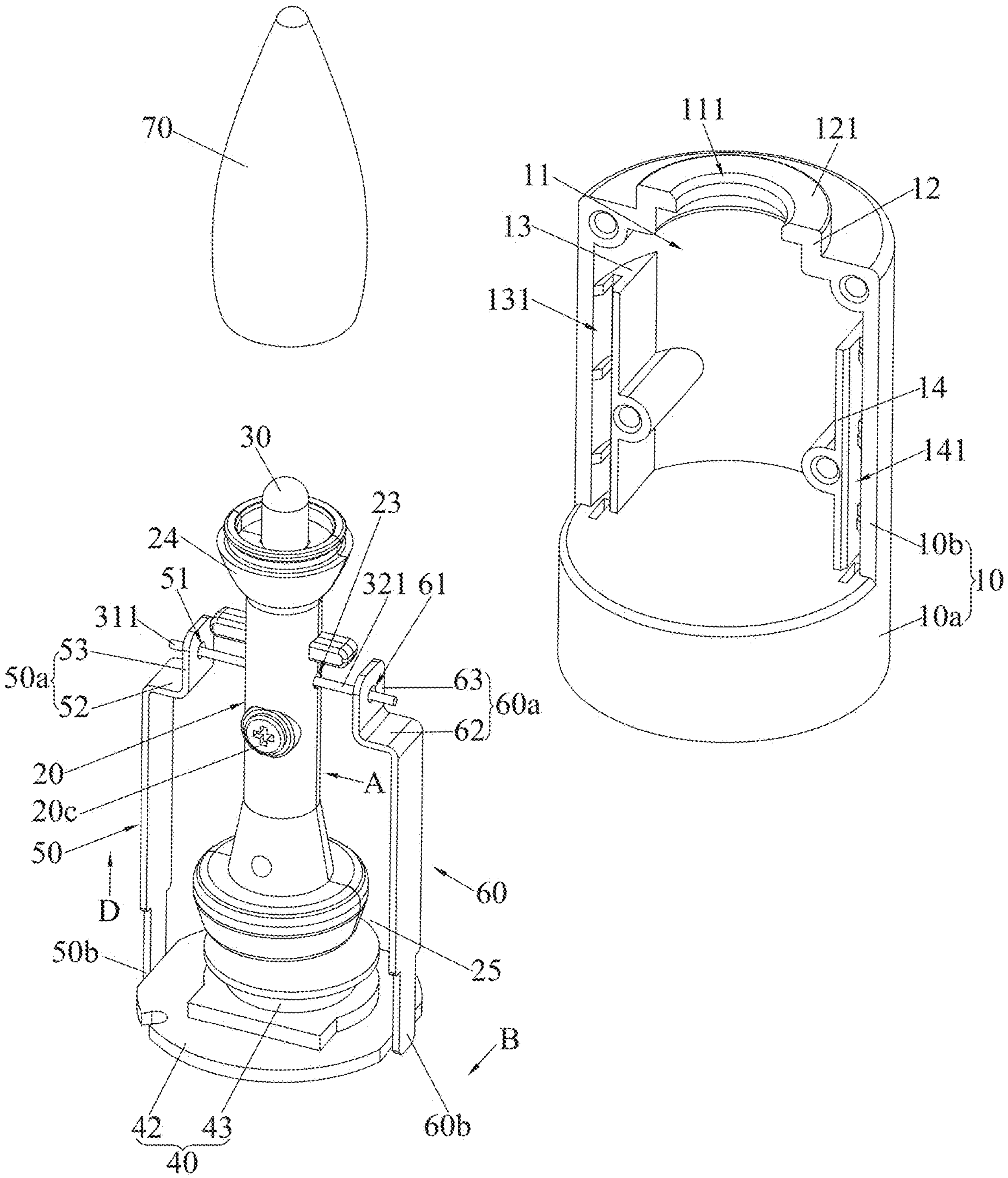
FIG. 6 is an exploded perspective view of FIG. 4.

Specifically, as shown in FIGS. 6 and 7, the first hole 51 and the second hole 61 are selected as through-holes. Clearly, according to actual needs, the first hole 51 and/or the second hole 61 can also be selected as blind holes (i.e., recesses), which are not limited to those shown in FIGS. 6 and 7. It should be noted that, although FIGS. 2 and 4 to 7 show that the first extension part 311 is provided by the first contact pin 31 and the second extension part 321 is provided by the second contact pin 32, it is also possible, according to actual needs, to have the first extension part 311 provided by the second contact pin 32 and the second extension part 321 provided by the first contact pin 31, which are not limited to those shown in FIGS. 2 and 4 to 7.

As shown in FIGS. 2 and 4-7, the swinging support frame 20 is positioned between the first and second electrode support members 50, 60 in the spaced-apart direction for compactness. The first extension part 311 is protruded from the side of the swinging support frame 20 facing the first electrode support member 50 (left side in FIGS. 2, 4-7), while the second extension part 321 is protruded from the side of the swinging support frame 20 facing the second electrode support member 60 (right side in FIGS. 2, 4-7). This design simplifies the rotatable connections and reduces structural complexity and shortens the length compared to alternative configurations.

Additionally, as shown in FIG. 7, as an exemplary embodiment, the swinging support frame 20 is internally provided with a channel 21, a first through-hole 22, and a second through-hole 23 that communicate with the channel 21. The channel 21 is extended upward through the top end 24 of the swinging support frame 20. The first through-hole 22 penetrates through the side wall of the swinging support frame 20 facing the first electrode support member 50 (i.e., the left side wall in FIG. 7), while the second through-hole 23 penetrates through the side wall of the swinging support frame 20 facing the second electrode support member 60 (i.e., the right side wall in FIG. 7). In this configuration, the first contact pin 31 and the second contact pin 32 are positioned within the channel 21. The first extension part 311 of the first contact pin 31 is protruded outward from the swinging support frame 20 through the first through-hole 22. The second extension part 321 of the second contact pin 32 is protruded outward from the swinging support frame 20 through the second through-hole 23. The electric lamp 30 is located at the top end 24 of the swinging support frame 20 and is externally exposed. In this configuration, the portions of the first contact pin 31 (excluding the first extension part 311) and the second contact pin 32 (excluding the second extension part 321) remain concealed within the swinging support frame 20, resulting in a more streamlined appearance. The structural arrangement, where the first extension part 311 is protruded through the first through-hole 22 and the second extension part 321 is protruded through the second through-hole 23, enhances the combined supporting strength of the first and second extension parts 311, 321 for the swinging motion of the swinging support frame 20.

To enhance the simulated candle effect of the swinging candle lamp 100 of the present invention, and with reference to FIGS. 1 through 7 as an exemplary embodiment, the swinging candle lamp 100 further includes a lampshade 70 that is assembled to the swinging support frame 20 and covers the electric lamp 30. This configuration allows light emitted from the electric lamp 30 to be transmitted through the lampshade 70. Optionally, as shown in FIG. 6, the lampshade 70 is assembled onto the top end 24 of the swinging support frame 20. It should be noted that, depending on practical requirements, alternative assembly methods between these components may be employed, and thus the arrangement is not limited to that shown in FIG. 6.

To facilitate the convenient assembly of the swinging support frame 20 with the electric lamp 30, lampshade 70, and magnet 41 (described below), the swinging support frame 20, as illustrated in FIG. 7, includes a first support frame **20*a* and a second support frame 20*b* that are assembled together along the swinging direction (indicated by arrow B and its opposite direction). The first support frame 20*a* and second support frame 20*b* cooperatively define the first through-hole 22, the second through-hole 23, and the channel 21. Specifically, a portion of the first through-hole 22 is located in the first support frame 20*a*, while the remaining portion is located in the second support frame 20*b*. A portion of the second through-hole 23 is located in the first support frame 20*a*, while the remaining portion is located in the second support frame 20*b*. A portion of the channel 21 is located in the first support frame 20*a*, while the remaining portion is located in the second support frame 20*b***.

Optionally, as an exemplary embodiment shown in conjunction with FIGS. 2 and 4-7, two locking screws **20*c* are employed to securely fasten the assembled first support frame 20*a* and second support frame 20*b* together, with the two locking screws 20*c* arranged in an upper-lower configuration. It should be noted that, depending on practical requirements, the quantity and arrangement of the locking screws 20*c* may vary, which are not limited to the configuration illustrated in FIG. 7. Furthermore, the first support frame 20*a*** may be fastened with the second support frame

20*b* by other fastening methods such as snap-fit connections, interference fits of pins and holes, adhesive bonding, or ultrasonic welding.

As illustrated in FIGS. 2-7, the candle lamp body 10 has a receiving cavity 11 with an opening 111 on its top surface 121. The swinging support frame 20 is housed in the cavity 11, with its top end 24 protruding from the opening 111. The electric lamp 30 is located at the top end 24 of the swinging support frame 20. The first and second holes 51, 61 are located near the opening 111. Therefore, the appearance of the swing candle lamp 100 of the present invention more compact.

Furthermore, as shown in FIGS. 2 to 7 as an exemplary embodiment, the side wall of the candle lamp body 10 is additionally provided with a first support 13 and a second support 14 that protrude into the receiving cavity 11. The first support 13 and the second support 14 are arranged spaced apart from each other in the spaced-apart direction. The first support 13 is provided with a first vertical passage 131, and the second support 14 is provided with a second vertical passage 141. The first electrode support member 50 is fittingly inserted in the first vertical passage 131, and the second electrode support member 60 is fittingly inserted in the second vertical passage 141. Thereby, the first support 13 enhances the supporting strength of the vertically arranged first electrode support member 50, while the second support 14 enhances the supporting strength of the vertically arranged second electrode support member 60.

Additionally, as further shown in FIGS. 2 to 7 as an exemplary embodiment, the upper end 50*a* of the first electrode support member 50 extends upward beyond the first vertical passage 131. The upper end 50*a* of the first electrode support member 50 includes a first bent portion 52 that bends toward a direction approaching the vertical central axis of the receiving cavity 11 (see the central axis in the vertical direction in FIG. 5), and a first support portion 53 that bends upward from the end of the first bent portion 52. The first hole 51 of the first electrode support member 50 is located on the first support portion 53. Similarly, the upper end 60*a* of the second electrode support member 60 extends upward beyond the second vertical passage 141. The upper end 60*a* of the second electrode support member 60 includes a second bent portion 62 that bends toward a direction approaching the vertical central axis of the receiving cavity 11, and a second support portion 63 that bends upward from the end of the second bent portion 62. The second hole 61 of the second electrode support member 60 is located on the second support portion 63. Thus, by means of the first bent portion 52, on one hand, the supporting strength of the first support 13 acting on the first support portion 53 through the first bent portion 52 is increased; on the other hand, the first support portion 53 is offset toward the vertical central axis of the receiving cavity 11, thereby reducing the span of engagement between the first extension part 311 and the first support portion 53. Similarly, by means of the second bent portion 62, on one hand, the supporting strength of the second support 14 acting on the second support portion 63 through the second bent portion 62 is increased; on the other hand, the second support portion 63 is offset toward the vertical central axis of the receiving cavity 11, thereby reducing the span of engagement between the second extension part 321 and the second support portion 63.

Figure 2:
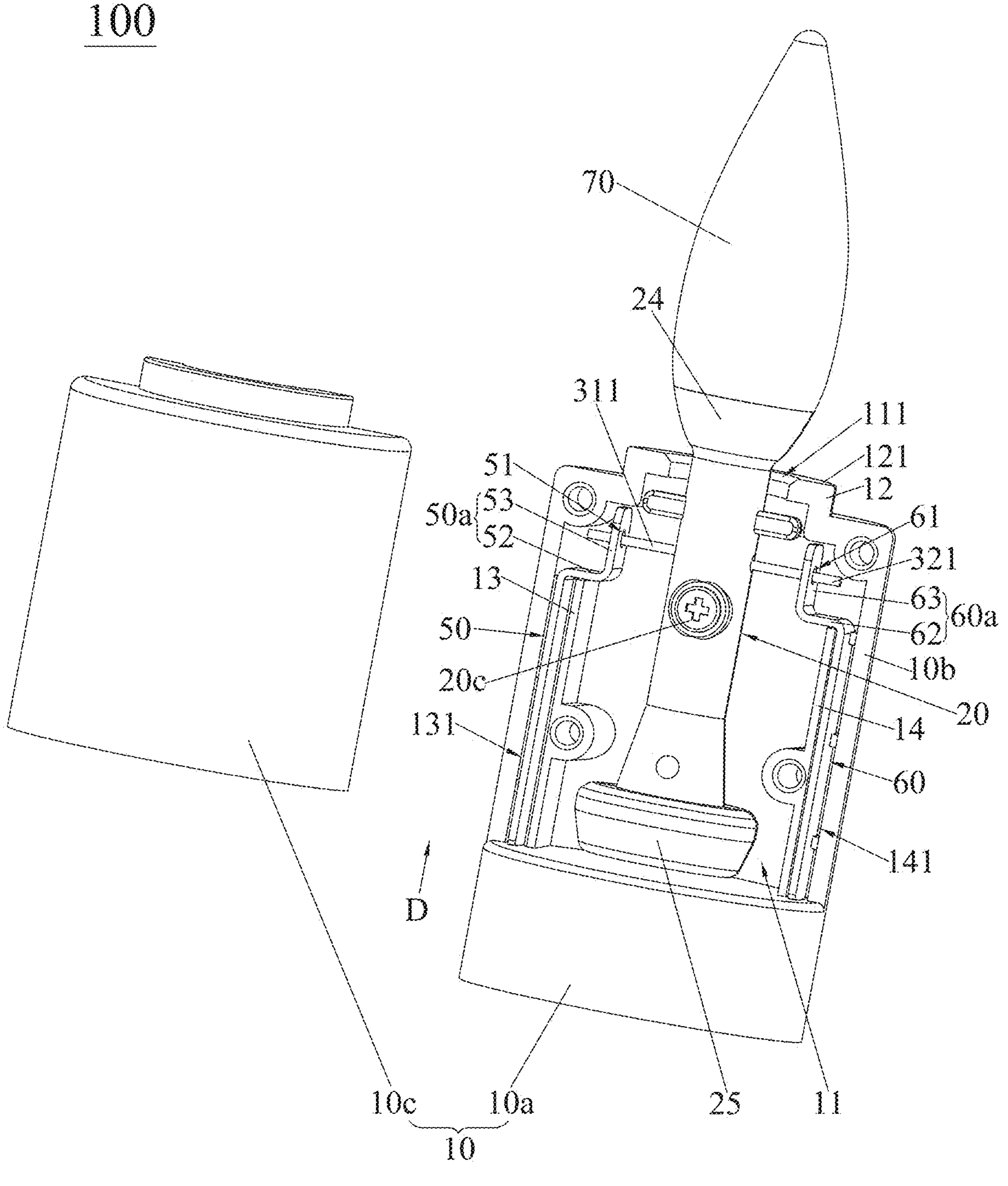
FIG. 2 is an exploded perspective view of the swinging candle lamp shown in FIG. 1.
Figure 3:
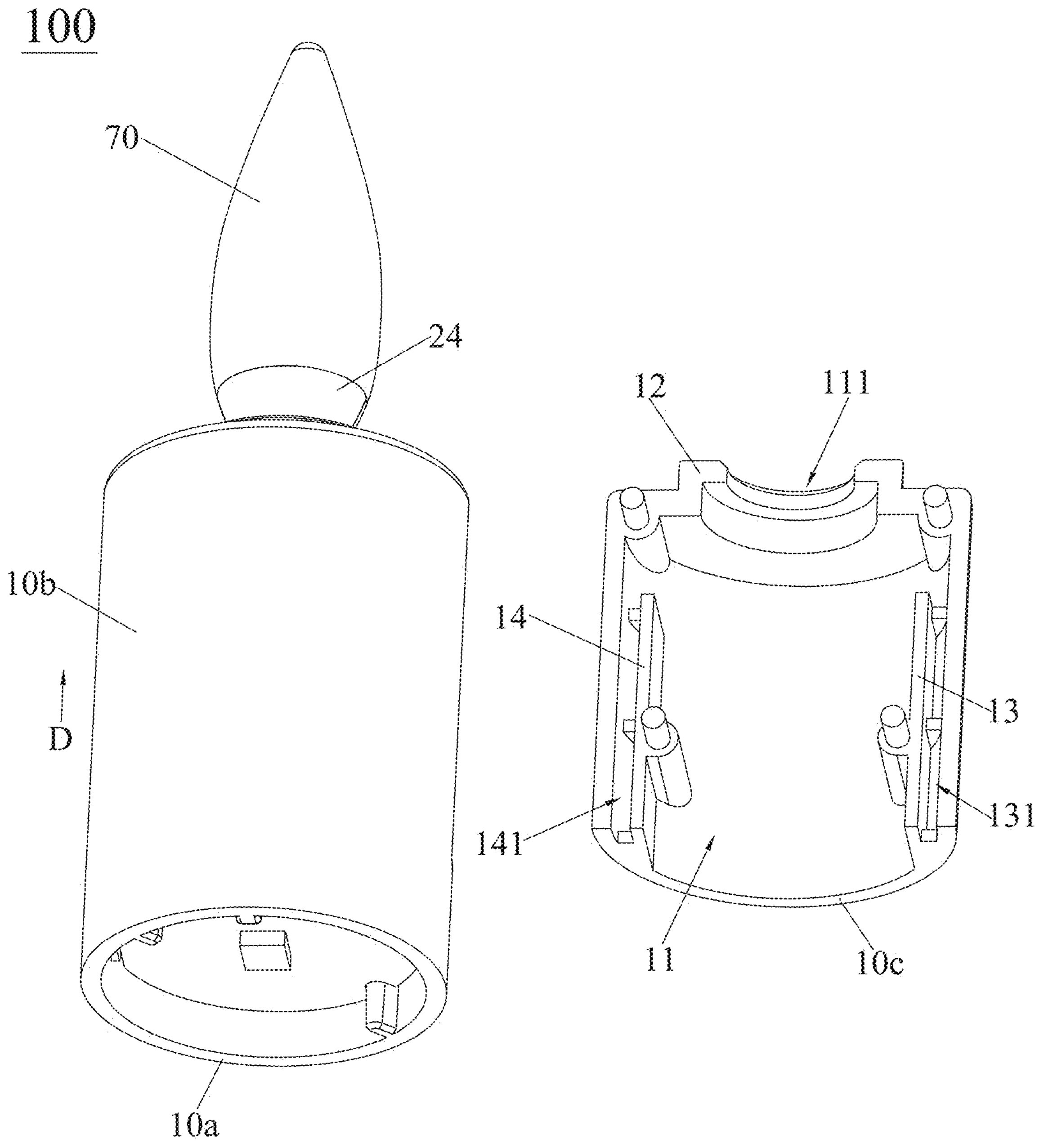
FIG. 3 is an exploded perspective view of the swinging candle lamp shown in FIG. 2 from another angle.
Figure 4:
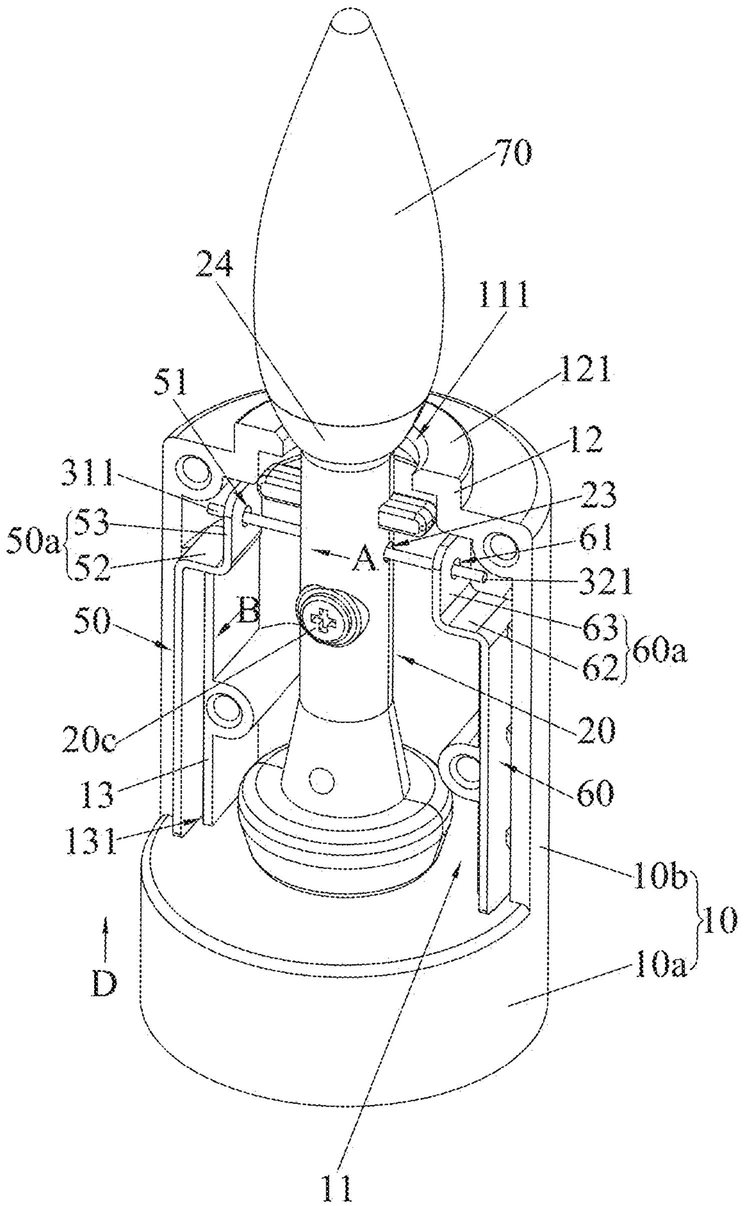
FIG. 4 is a perspective view of the swinging candle lamp shown in FIG. 1 with the second upright frame of the candle lamp body hidden.
Figure 5:
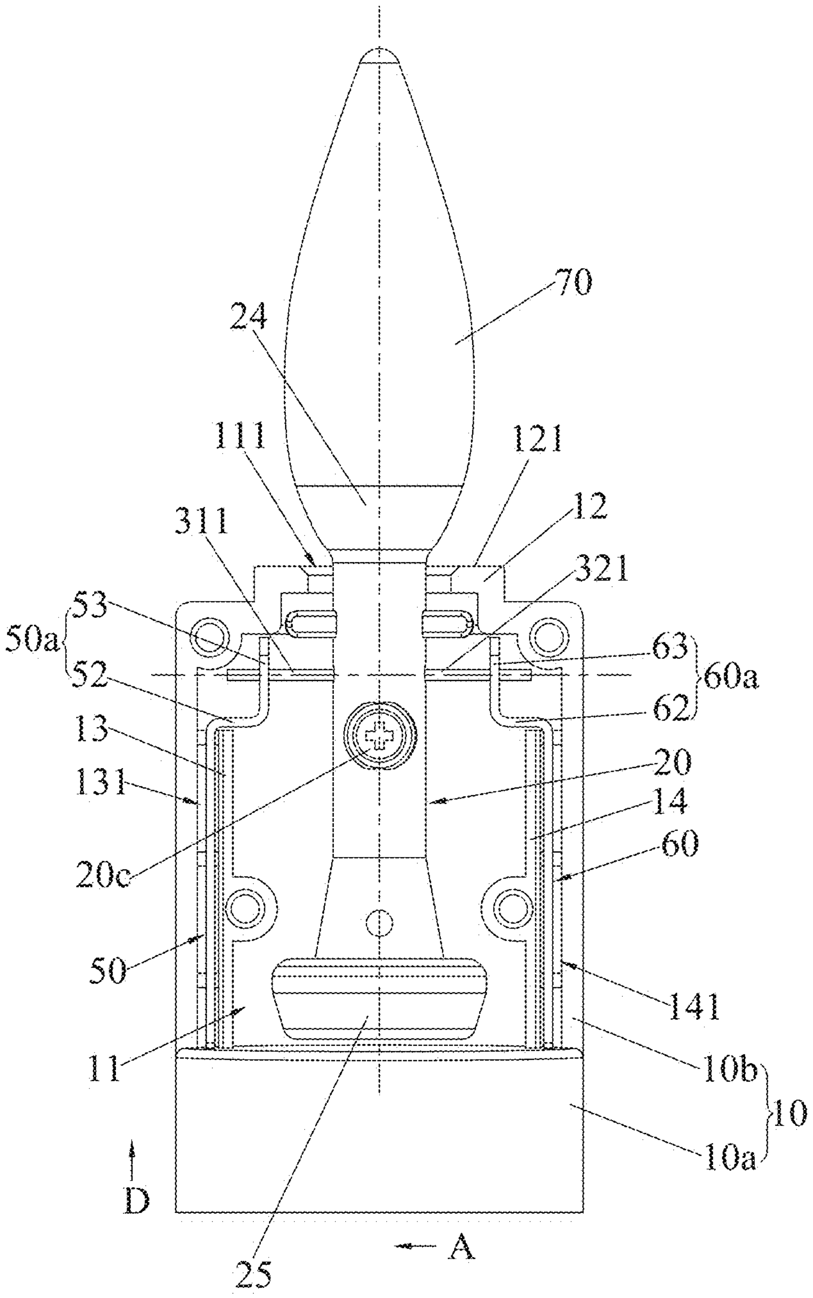
FIG. 5 is a plan view of FIG. 4 viewed in the opposite direction of arrow B.

As shown in FIGS. 1 to 3, as an exemplary embodiment, the candle lamp body 10 includes a base 10*a*, a first upright frame 10*b* connected to the base 10*a* and protruding upward therefrom, and a second upright frame 10*c* assembled with the first upright frame 10*b* in the swinging direction. The second upright frame 10*c* is spaced apart from the base 10*a* in the vertical direction. The second upright frame 10*c* and first upright frame 10*b* together define the receiving cavity 11, the first vertical passage 131 and the second vertical passage 141, such that part of the receiving cavity 11 is located in the first upright frame 10*b* while the remainder is in the second upright frame 10*c*; part of the first vertical passage 131 is located in the first upright frame 10*b* while the remainder is in the second upright frame 10*c*; part of the second vertical passage 141 is located in the first upright frame 10*b* while the remainder is in the second upright frame 10*c*. This configuration facilitates the assembly of the swinging support frame 20, the first electrode support member 50 and the second electrode support member 60 with the candle lamp body 10. Specifically, as shown in FIGS. 2 and 3, the base 10*a* and first upright frame 10*b* together form an integrated structure, i.e., they may be manufactured as one piece through integral molding. Of course, they may also be fixed together through assembly.

As shown in FIG. 7, as an exemplary embodiment, the driving device 40 includes a magnet 41 installed at the bottom end 25 of the swinging support frame 20, and a circuit board 42 and induction coil 43 installed on the base 10*a*. The lower end 50*b* of the first electrode support member 50, the lower end 60*b* of the second electrode support member 60, and the induction coil 43 are all electrically connected to the circuit board 42. The circuit board 42 is configured to control the induction coil 43 to be energized or de-energized, and the swinging support frame 20 is driven to swing under the cooperation of the magnet 41 and the induction coil 43 that is energized or de-energized. Since the control of the energization/de-energization of the induction coil by the circuit board is well-known in the art, it will not be elaborated here.

Compared with prior art, in the present invention, one of the first electrode support member 50 and second electrode support member 60 is rotatably and electrically connected with the first contact pin 31, while the other is rotatably and electrically connected with the second contact pin 32, thus the first and second contact pins 31, 32 integrates both rotational and electrical connection functions. On one hand, the need for electrical connection wiring between the light emitter and driving device in conventional designs is eliminated, resulting in simpler structure and easier assembly. On the other hand, it allows the driving device 40 to be installed on the candle lamp body 10 while the electric lamp 30 is mounted on the swinging support frame 20, thereby overcoming the limitation in prior art where the driving device and light emitter could only be installed together on the lamp head.

It should be noted that, the swinging candle lamp 100 of the present invention may be powered by external mains or built-in power supply. The electric lamp 30 may be an LED lamp, though other types of lamps may be selected as needed. The first electrode support member 50 may serve as the positive electrode support while the second electrode support member 60 serves as the negative electrode support, though this is not limiting. As shown in FIG. 7, the first and second contact pins 31, 32 are slender columnar structures.

The above descriptions are merely preferred embodiments of the present application and are not intended to limit the scope of the application. Any modifications, equivalent substitutions, or improvements made within the spirit and principles of the present application should be included within the protection scope of the present application.

What is claimed is:

1. A swinging candle lamp, comprising a candle lamp body, a swinging support frame, an electric lamp assembled on the swinging support frame, and a driving device for driving the swinging support frame to perform a swinging motion, wherein the swinging candle lamp further comprises a first electrode support member and a second electrode support member assembled on the candle lamp body and spaced apart from each other, the electric lamp is electrically connected with a first contact pin and a second contact pin, one of the first electrode support member and the second electrode support member is electrically connected and rotatably connected with the first contact pin, and the other one of the first electrode support member and the second electrode support member is electrically connected and rotatably connected with the second contact pin, the swingable support frame is swingably supported on the candle lamp body, rotation centerlines of the first contact pin and the second contact pin are collinear, and the driving device is assembled on the swinging support frame and the candle lamp body;

wherein the candle lamp body is internally provided with a receiving cavity, an opening of the receiving cavity is located on a top surface of the candle lamp body;

wherein a side wall of the candle lamp body is further provided with a first support and a second support protruding into the receiving cavity, the first support and the second support are arranged spaced apart, the first support is provided with a first vertical passage, the second support is provided with a second vertical passage, the first electrode support member is fittingly inserted in the first vertical passage, the second electrode support member is fittingly inserted in the second vertical passage.

2. The swinging candle lamp according to claim 1, wherein the first electrode support member is provided with a first hole, the first contact pin is provided with a first extension part extending along a spaced-apart direction of the first electrode support member and the second electrode support member, and the first extension part is rotatably and electrically inserted into the first hole;

the second electrode support member is provided with a second hole, the second contact pin is provided with a second extension part extending along the spaced-apart direction, the second extension part is rotatably and electrically inserted into the second hole; and the first extension part and the second extension part are coaxially arranged.

3. The swinging candle lamp according to claim 2, wherein the swinging support frame is located between the first electrode support member and the second electrode support member in the spaced-apart direction; and the driving device is electrically connected with the first electrode support member and the second electrode support member respectively.

4. The swinging candle lamp according to claim 3, wherein the first extension part is protruded from a side of the swinging support frame facing the first electrode support member, and the second extension part is protruded from a side of the swinging support frame facing the second electrode support member.

5. The swinging candle lamp according to claim 4, wherein the swinging support frame is internally provided with a channel, a first through hole, and a second through hole communicating with the channel, the channel penetrates upward through a top end of the swinging support frame, the first through hole penetrates through a side wall of the swinging support frame facing the first electrode support member, the second through hole penetrates through a side wall of the swinging support frame facing the second electrode support member; the first contact pin and the second contact pin are located in the channel, the first extension part on the first contact pin is extended out of the swinging support frame through the first through hole, the second extension part on the second contact pin is extended out of the swinging support frame through the second through hole, and the electric lamp is located at the top end of the swinging support frame and exposed externally.

6. The swinging candle lamp according to claim 5, further comprising a lampshade assembled and connected with the swinging support frame and covering the electric lamp.

7. The swinging candle lamp according to claim 5, wherein the swinging support frame comprises a first support frame and a second support frame assembled together in a swinging direction, and the first support frame and the second support frame jointly define the first through hole, the second through hole, and the channel.

8. The swinging candle lamp according to claim 2, wherein the swinging support frame is located in the receiving cavity, a top end of the swinging support frame is extended out of the candle lamp body through the opening, the electric lamp is located on the top end of the swinging support frame; the first hole of the first electrode support member is located in the receiving cavity near the opening, and the second hole of the second electrode support member is located in the receiving cavity near the opening.

9. The swinging candle lamp according to claim 1, wherein an upper end of the first electrode support member is extended upward out of the first vertical passage, the upper end of the first electrode support member is provided with a first bending portion bent toward a direction close to a vertical central line of the receiving cavity and a first support portion bent upward from an end of the first bending portion, the first hole of the first electrode support member is located on the first support portion.

10. The swinging candle lamp according to claim 9, wherein an upper end of the second electrode support member is extended upward out of the second vertical passage, the upper end of the second electrode support member is provided with a second bending portion bent toward a direction close to the vertical central line of the receiving cavity and a second support portion bent upward from an end of the second bending portion, and the second hole of the second electrode support member is located on the second support portion.

11. The swinging candle lamp according to claim 1, wherein the candle lamp body comprises a base, a first upright frame connected with the base and protruding upward from the base, and a second upright frame assembled with the first upright frame in the swinging direction, the second upright frame is spaced apart from the base in a vertical direction, and the second upright frame and the first upright frame jointly define the receiving cavity, the first vertical passage, and the second vertical passage.

12. The swinging candle lamp according to claim 11, wherein the driving device comprises a magnet installed at a bottom end of the swinging support frame, a circuit board, and an induction coil installed on the base, a lower end of the first electrode support member, a lower end of the second electrode support member, and the induction coil are all electrically connected with the circuit board, the circuit board is configured to control the induction coil to be energized or de-energized, and the swinging support frame is driven to swing under a cooperation of the magnet and the induction coil that is energized or de-energized.

13. The swinging candle lamp according to claim 1, wherein the first electrode support member is provided with a first extension part extending along a spaced-apart direction of the first electrode support member and the second electrode support member, the first contact pin is provided with a first hole, and the first extension part is rotatably and electrically inserted into the first hole;

the second electrode support member is provided with a second extension part extending along the spaced-apart direction, the second contact pin is provided with a second hole, the second extension part is rotatably and electrically inserted into the second hole; and the first extension part and the second extension part are coaxially arranged.

* * * * *